Augustus J. Ohmer's Lawn Mower
110388
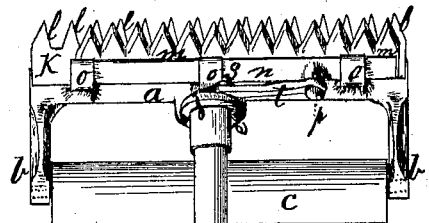
PATENTED DEC 20 1870
Fig. 1.
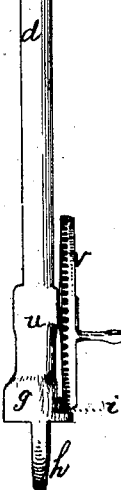
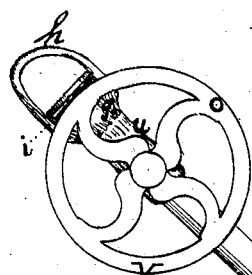
Fig. 2.
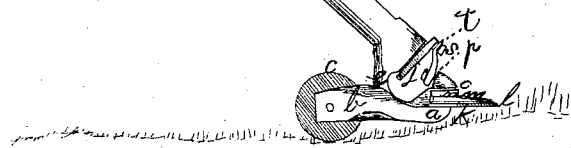
Witnesses
S. R. Evans
Barney Doud
Augustus J. Ohmer
Inventor
by his Attorney
H. P. K. Peck
THE NORRIS PETERS CO., WASHINGTON, D. C.

United States Patent Office.

AUGUSTUS J. OHMER, OF HAMILTON, OHIO.

Letters Patent No. 110,388, dated December 20, 1870.

IMPROVEMENT IN LAWN-MOWERS.

The Schedule referred to in these Letters Patent and making part of the same.

*To all whom it may concern:*

Be it known that I, AUGUSTUS J. OHMER, of Hamilton, in the county of Butler, in the State of Ohio, have invented a new and useful Improvement in "Trimming Lawn-Mowers;" and I do hereby declare that the following is a full and exact description thereof, reference being had to the accompanying drawing and the letters of reference marked thereon.

Figure 1 represents a plan or top view of my machine.

Figure 2 represents a side elevation of the same.

The object of my invention is to provide a hand mowing-machine for mowing lawns, flower-plats, and small inclosures in which shrubbery is cultivated, and in which ornamental structures, lattices, &c., are erected. My machine is designed to work in contact with these obstructions, and to completely trim the grass around and beneath them without any risk of injuring them or the machine.

In the accompanying drawing—

$a$ denotes a metal bed-plate, which is constructed with the two rearwardly-projecting arms $b\ b$, between the ends of which roller $c$ is journaled.

A tubular handle, $d$, formed at its lower end with a bulb having a shank $e$, is secured to the center and at the rear edge of the bed-plate $a$.

The upper end of the handle $d$ is enlarged, and formed with a shield, $g$, and hand-loop, $h$.

A shaft, which is provided with a beveled pinion, $i$, at its upper end, and with a crank-wheel, $j$, at its lower end, is inserted in the tubular handle $d$.

A thin finger-plate, $k$, having fingers, $l$, is fastened upon the front edge of the bed-plate $a$, and the short sickle $m$ has a sickle-bar, $n$, secured upon its upper side, and metal guides or clasps, $o$, are made fast to the bed-plate $a$, and embrace the sickle-bar $n$ in the usual manner.

The inclined stud $p$ is secured to the sickle-bar $n$ at a proper distance from its ends to prevent it from coming in contact with either of the guides $o$ when the sickle vibrates, and for the purpose of preventing the stud $p$ from coming in contact with obstructions when the machine is in use.

The crank-pin $s$ and stud $p$ are connected by pitman $t$, as seen in fig. 2 of the drawing.

A short journal is secured to the enlargement $u$ of the handle $d$, for the beveled gear and crank-wheel $v$, which meshes with the beveled pinion $i$ on the shaft inserted in tubular handle $d$.

The shield $g$ serves to protect the hand of the person using the machine from being caught in the gearing; and the tubular handle protects from contact with the shaft by which the sickle is operated.

As the sickle-points are very little shorter than the fingers $l$, my machine will trim the grass which grows in close proximity with walls and fences; and as the sickle in its vibrating movement does not move beyond the ends of the finger-plate $k$, it may be thrust or driven along with either of its sides in close contact with shrubbery, ornamental structures, or other obstructions, and the end fingers will gather every blade of grass to the sickle, and thus the work will be nicely completed without the aid of a knife or hand-sickle.

Besides, the central arrangement of the handle $d$ and the driving mechanism enables my machine to be used underneath fixed seats or lattices with ease and facility.

It is apparent that the bed-plate or shoe $a$ would support the machine without the use of roller $c$, and in that modification the arms $b$ would not be required; but by the use of the roller $c$ the machine is more easily propelled, and a person using it is enabled to trim grass at different heights by simply varying the angle at which the handle $d$ is held.

To operate my lawn-trimmer, a person will clasp the metal loop $h$ with the left hand and the crank-pin of wheel $v$ with the right hand, and as the machine is thrust forward the crank-wheel will be revolved by the operator, and, through the gearing $i\ v$, and the driving-shaft, motion will be communicated to the pitman and sickle.

Having fully described my invention,

What I claim as new, and desire to secure by Letters Patent, is—

The tubular handle $d$ for the driving shaft, provided with the shield $g$ for protecting the gearing, in the manner and for the purpose substantially as described.

In testimony whereof I have hereunto set my hand this 16th day of August, 1870.

A. J. OHMER.

Witnesses:
H. P. K. PECK,
A. L. PECK.